Feb. 15, 1966  D. J. BAKER  3,235,827
SUBMINIATURE POTENTIOMETER
Filed Oct. 16, 1961

INVENTOR.
DONALD J. BAKER
BY
ATTORNEY.

United States Patent Office 3,235,827
Patented Feb. 15, 1966

3,235,827
SUBMINIATURE POTENTIOMETER
Donald J. Baker, 938–D 15th St., Santa Monica, Calif.
Filed Oct. 16, 1961, Ser. No. 145,204
27 Claims. (Cl. 338—162)

This invention relates to potentiometers and more particularly to an improved subminiature construction of this type featuring unusual compactness, requiring no fasteners of any kind, designed for assembly without tools and further characterized by its capability for stacking in large numbers in immediate contact with one another with the adjuster for each device fully accessible for individual adjustment.

There is an ever expanding need for lighter, smaller, precision electronic components of maximum efficiency and reliability. Spacecraft, military weaponry, computers and airborne electronic equipment are typical examples of operating environments having such needs. Potentiometers are typical electronic components required in large numbers for use in such equipment.

Potentiometer constructions heretofore provided to meet the foregoing and other requirements are subject to certain disadvantages and shortcomings sought to be overcome by the present invention. Typical disadvantages of prior designs is the need for fasteners between individual components as well as between major subassemblies. It is most desirable that such fasteners be eliminated. This is particularly true of potentiometer devices where devices are so small that tens of these units may be placed within a single cubic inch of space. The construction disclosed herein meets these needs in a highly satisfactory manner, the working components being held movably in their essential operating relationships without fasteners and by reason of their relative shapes and tolerance variations and mutually cooperating structural configurations.

Another serious shortcoming of prior potentiometers has been the provision made for adjusting the movable contacter along the resistance unit with precision, certainty and convenience from a point exterior to the casing proper. One type of adjustable control makes use of a rotatable worm gear journaled in the casing with its teeth meshing with gear teeth formed along the rim of a rotary disc type contacter. This arrangement which has been carried out in many different structural embodiments has certain advantages but is attended by other serious disadvantages. Precise control of the setting is possible but one complete revolution of the adjusting screw or worm is required to rotate the contacter a distance of one tooth. It will therefore be appreciated that it is a time-consuming and laborious operation to adjust a large number of individual potentiometers in a typical operating environment, particularly where wide range adjustment is involved. This objection can be minimized according to other proposals by mounting the adjusting screw on an axis parallel to the rotary contacter and utilizing a small pinion gear in lieu of the worm. However, this expedient increases the size of the potentiometer objectionably and requires that the adjusting member be accessible from one end face of the potentiometer. This is a serious drawback since it introduces serious limitations respecting the manner of mounting the potentiometer relative to other components and prohibits compact assemblage of a group of potentiometers.

The foregoing and numerous other disadvantages of prior constructions are avoided by the present invention. The device disclosed employs an unusually small number of components which interfit with cavities of the two-piece casing to the end that all are held in precise and smooth operating relationship without need for fasteners of any kind and are capable of being assembled without need for tools or assembly jigs. The lower casing half is channeled to receive the annular resistance unit to the opposite ends of which two principal terminal leads are firmly connected. The second major component comprises a channel-shaped contactor ring and an attached resilient driven ring therefor. The third terminal member for the device interfits with cavities of the casing to hold the inner end of the terminal in firm but resilient wiping contact with the rotating contactor. The fourth component comprises a one-piece adjuster provided with involute gear teeth meshing with similar teeth molded into the upper surface of the driven ring. This limited number of simple components is enclosed and held in place by a cover which is secured in place by bonding technique and/or by a single eyelet clenched to the opposite ends of the mounting opening passing centrally through the wafer.

A further feature of the invention of very considerable importance is the provision made for holding the potentiometer adjustably secured to a supporting surface by a single fastener device of any suitable construction. To this end, the device is provided with a single central opening passing completely through the wafer-like casing. The fastener is assembled through this opening and used to clamp the casing frictionally to adjacent similar devices or to any other component after first taking care to rotate the device about the fastener to a desired oriented position and usually one wherein the contact adjuster is accessible most conveniently. Stacking and securing a number of the potentiometers in place with each oriented to any desired position using only a single fastener is made possible by the novel expedient just described and constituting a feature of this invention. If desired, all parts of the potentiometer are held locked in assembled position by an eyelet having a snug fit within this single mounting opening and having its ends clenched against the recessed rim edges of the opening. This assembly fastener is not essential and may be omitted in the more economical versions of the invention.

It is therefore a primary object of the present invention to provide an improved subminiature potentiometer of improved design, compactness, simplicity and reliability.

Another object of the invention is the provision of a subminiature potentiometer so designed that the components are held movably assembled without need for fasteners.

Another object of the invention is the provision of a potentiometer having a single mounting opening passing centrally through the casing and adapted to receive a mounting fastener, the presence of the single centrally disposed mounting opening permitting the casing to be rotated to any desired oriented position and then clamped in this place by tightening of the fastener.

Another object of the invention is the provision of a potentiometer having a multiple part casing having aligned centrally disposed opening for receiving an assembly eyelet by which the parts are held clenched together and through which a single fastener common to a stack of similar casings can be passed and tightened to hold each of the cases frictionally clamped in a selected predetermined oriented position.

Another object of the invention is the provision of a potentiometer adjustable from the exterior of its enclosure by a positive drive connection requiring but a few revolutions to adjust the potentiometer throughout its operating range.

Another object of the invention is the provision of a simplified potentiometer construction the diametrically-opposed exterior peripheral portions of which are cut away and having radial passages opening thereinto seating, respectively, the terminal wires and the adjusting screw of the potentiometer, whereby a large number of the potentiometers may be compactly stacked in close proximity without interfering with accessibility to the adjuster for each potentiometer.

These and other more specific objects will appear upon reading the following specification and claims and upon considering in connection therewith the attached drawings to which they relate.

Referring now to the drawings in which a preferred embodiment of the invention is illustrated.

Figure 1:
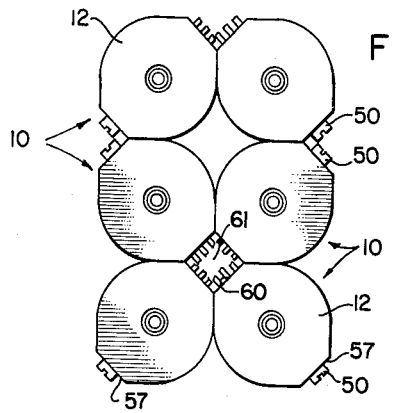
FIGURE 1 is a top plan view showing a plurality of the potentiometers of this invention compactly stacked in one typical arrangement thereof.
Figure 2:
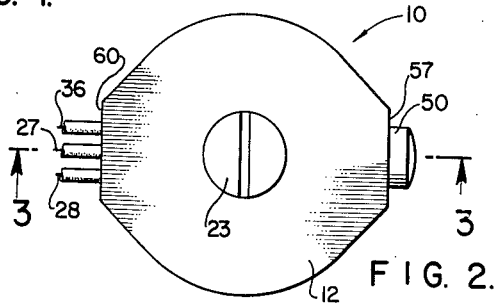
FIGURE 2 is a greatly enlarged top plan view of a stack of the potentiometers clamped against one another.

Referring more particularly to FIGURES 2 to 6, there is shown a preferred embodiment of a potentiometer designated generally 10 constructed in accordance with the principles of the present invention. Potentiometer 10 has a two-part casing including a lower half 11 and an upper half or cover 12 which mate with one another along the flat surface indicated at 13, these surfaces preferably being bonded or adhesively secured together as by a suitable adhesive composition such as epoxy or the like. One of the two halves here shown, as lower half 11, is preferably provided with a pair of diametrically-opposed locater posts 15 having a snug fit with complementally-shaped recesses 16 opening into the under surface of cover 12 in alignment with posts 15. These interfitting posts and recesses assure that the parts of the casing must be assembled precisely in a predetermined relationship thereby avoiding the possibility of jamming and misalignment of internal components of the potentiometer and resultant malfunctioning or nonfunctioning of the device. A further feature of the casing is the provision of a central opening 17 extending entirely through the casing and by means of which one or a stack of the devices may be secured adjustably to an assemblage by a through bolt screw or other type of fastener. This aspect of the invention will be described in greater detail presently.

It will be understood that casing members 11 and 12 are preferably precision molded from suitable insulating material as plastic, hard elastomer or other material not subject to shrinkage, deformation or warping and immune to attack by fluids in the intended operating environment. Various suitable materials for these purposes and meeting these requirements are well known in commercial circles.

All internal components with the exception of the adjuster member are assembled within cavities and receiving recesses formed in the lower casing half 11. To this end, half 11 is provided with a continuous annular groove having a relatively narrow deep lower portion 20 and a relatively wide shallow upper portion 21. The bottom of wider groove 21 provides generally similar shoulders 22 located to either side of deeper groove 20 for a purpose which will be explained more fully presently.

Snugly seated within groove 20 is an annular resistance unit having a split ring core of insulating material 24 supporting a helical winding of resistance wire 25 about its exterior. The opposite ends of winding 25 are brazed or otherwise secured to the inner ends of a pair of insulated terminal leads 27 and 28 respectively. The resistance unit has a firm frictional fit within the bottom of groove 20; and preferably has a diameter slightly different than the diameter of groove 20. Accordingly, it will be understood that the resiliency of core 24 is utilized to grip one of the side walls of groove 20 and aids materially in holding the unit firmly seated therein.

Figure 3:
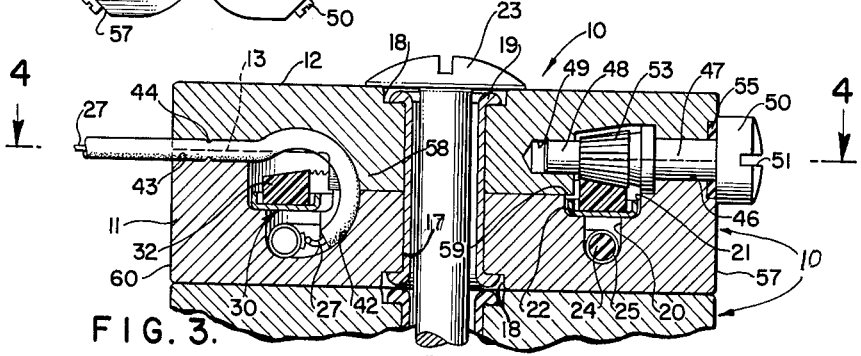
FIGURE 3 is a further enlargement showing a cross-sectional view taken along line 3—3 on FIGURE 2.

Rotatably supported on shoulders 22, 22 constituting the bottom of upper groove 21 is a rotary metal contacter ring 30 of generally channel-shape in cross-section, as clearly appears from FIGURE 3. The upturned inner and outer edges of this ring are of slightly lower height than the depth of groove 21 with the result that this ring is confined entirely to groove 21. However, the difference in the height of ring 30 and of groove 21 in an actual subminiature embodiment of the potentiometer is a matter of about one mil. An equal or slightly greater clearance exists between the opposed outer surfaces of the upturned lips of the ring and the adjacent side walls of groove 21.

Figure 5:
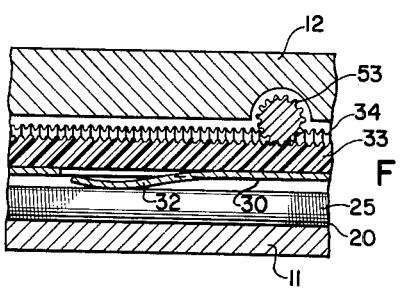
FIGURE 5 is a fragmentary cross-sectional view taken along line 5—5 on FIGURE 4.
Figure 6:
FIGURE 6 is a fragmentary developed view taken along the arcuate line indicated by line 6—6 on FIGURE 4.

As will be best understood from FIGURES 4, 5 and 6, a U-shaped slit in the bottom contacter ring 30 provides a resilient contacter finger 32 projecting below the main body of the ring and riding against winding 25 of the resistance unit. Firmly fixed to the inner upper surface of contacter ring 30, as by a suitable bonding or adhesive agent, is a ring gear 33 provided with epicycloidal teeth 34. These teeth may be molded into the material or they may be machined therein by precision milling equipment, or otherwise generated by any suitable technique.

Figure 4:
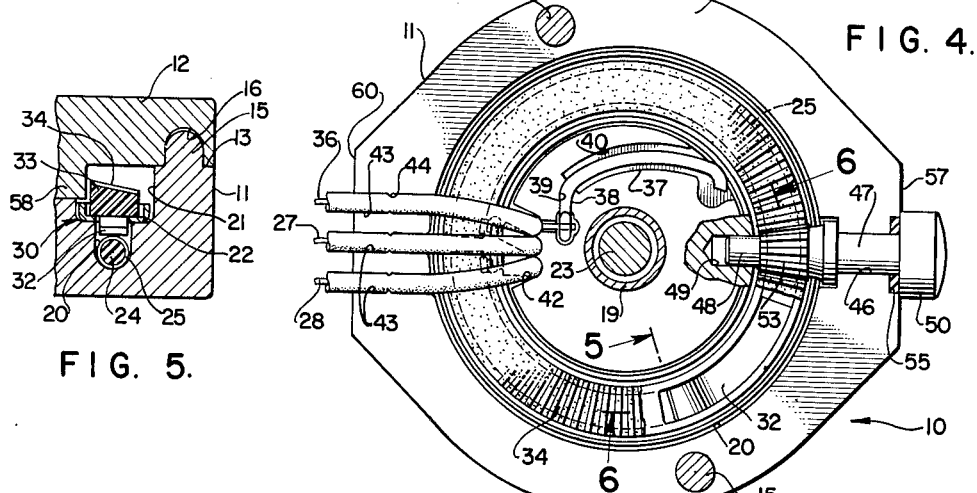
FIGURE 4 is a plan view of the components in assembled relation with the cover removed and as viewed along the broken line 4—4 on FIGURE 3.

Referring to FIGURE 4, it is pointed out that the third insulated terminal lead wire 36 for the potentiometer is brazed, soldered or otherwise firmly secured to one end of an elongated resilient contacter finger 37 of generally L-shape. Shorter leg 38 of contacter 37 fits snugly between the upstanding walls of a receiving well 39 in lower casing half 11. The longer arcuate leg of contacter 37 extends along a much wider recess 40 opening through the inner side wall of groove 21 with its rounded free end bearing against the upturned inner side wall of contacter ring 30 and forms an excellent electrical contact with this ring in all rotary positions thereof.

As will be observed from a consideration of FIGURES 3 and 4, the three terminal leads 27, 28 and 36 have a semi-circular configuration at their inner ends fitting rather snugly within the correspondingly contoured recess 42 formed in casing half 11 and opening at its lower end through the inner side wall of groove 20. It will be understood that the upper half of well 42 is formed in the overlying portion of cover 12 as is best seen in FIGURE 3. It is further pointed out that each of these terminal leads extends through the end wall of the casing through individual passages 43 formed partially in the lip edge of casing 11 and in part in the corresponding lip portion of cover 12. Sharp-edged projections 44 molded into the casing parts 11 and 12 cut partially into the insulation of the terminal leads and are effective to anchor the leads against displacement longitudinally of passages 43.

Positioned diametrically opposite passages 43 for the lead wires in a corresponding transverse passage 46 likewise located partially in the two casing halves and providing a journal for the cylindrical midsection of the one-piece adjuster 47. The cylindrical inner end 48 of adjuster 47 is journaled in a cavity 49 of cover 12. The outer end 50 of the adjuster is slotted at 51 to receive a screw driver or appropriate tool for rotating the adjuster about its longitudinal axis. Integral with the inner end of the adjuster is a tooth pinion 53 having epicycloidal teeth meshing with the teeth 34 of driven ring gear 33 fixed to contacter ring 30. Suitable resilient packing, as ring 55, is held compressed by adjuster 47 adjacent the enlarged outer end 50 thereof and safeguards against the entrance of moisture and the like into the interior of the casing.

Attention is called to the fact that cover 12 preferably includes a depending boss 58 surrounding passage 17 and having a diameter slightly in excess of the diameter of the inner side wall of groove 21. It will therefore be recognized that the lower rim edge 59 of boss 58 overlies the inner edge of groove 21 as well as the inner upstanding wall of rotary contacter 30 in the manner made clear by FIGURE 3. Accordingly, the substantially continuous rim edge 59 is effective to hold the contacter rotatably seated within groove 21 around the entire rim of the contacter. The drawing seems to indicate that there is a considerable gap between rim 59 and the upper edge of the contacter side wall. However, when the greatly enlarged scale to which the drawings are drawn is borne in mind, it will be realized that, in reality, this gap is only that necessary to provide a smooth rotating fit between the parts and that for this reason rim 59 is effective to maintain the resilient contacter finger 32 in firm contact with the resistance element in all adjusted positions of the contacter and even though the finger 32 may be adjusted to a position on the opposite side of the element from pinion 53.

The mode of assembly of the parts will be quite apparent from the foregoing detailed description of the structure. In this connection, it is pointed out that the parts are assembled into the lower half 11 with the exception of adjuster 47. The latter is assembled into recess 49 and passage 46 of cover 12 following which these assembled components are placed on top of the elements assembled into lower half 11. Prior to this final step, a thin layer of adhesive is applied to surface 13, care being exercised not to have adhesive contact the surface of passage 46 or the surface of adjuster 47 in contact therewith. When the parts have been coated, the cover is applied and preferably placed under pressure until the adhesive takes a set. In the meantime, adjuster 47 may be rotated to make certain that no adhesive is in contact with that part.

Referring more particularly to FIGURE 3 it is pointed out the centrally disposed opening or passage 17 extending completely through the casing parts 11 and 12 is preferably provided with annular recesses 18 at its opposite ends to which are clenched the ends of a tubular eyelet 19 of metal or other suitable material. The presence of the eyelet assures a stronger assembly and avoids the need for holding the parts pressed together until the adhesive takes a set. However, it will be understood that eyelet 19 may be omitted and reliance had on the adhesive between the contacting faces of parts 11 and 12 to hold the casing assembled. In fact, a hermetic seal is not essential, the adhesive may be used primarily or solely between pins 15, 15 and the seating wells therefor, thereby minimizing the likelihood of adhesive migrating into the casing cavity.

Assembled through either passage 17, or through eyelet 19 if one is present, is any suitable mounting fastener here represented by a typical screw 23. The shank of this screw has a loose fit with the central opening 17 and it will be understood that it may be as long as necessary to accommodate any number of devices 10 threaded upon the fastener shank and in intimate contact with one another. Before tightening the fastener to clamp devices 10 firmly together, each is rotated until its terminal wires, its contactor adjusting screw 50, or both, are in a desired position circumferentially of fastener 23 for most convenient access considered from the particular environmental conditions presented. Once this adjustment has been determined, screw 23 is tightened and left in this condition until or unless a change is desired in the oriented position of one or more of devices 10. The mounting screw for each stack of potentiometers 10 shown in FIGURE 1 have been omitted for purposes of clarity but will be understood as normally present in the fully installed condition of the potentiometers.

Referring to FIGURE 1, there is shown one preferred arrangement by which a plurality of the described potentiometer units may be compactly stacked while leaving the adjusting screw 47 of each readily accessible along the exterior edges of the stacks. Desirably, the end surfaces of the casings through which passages 43 and 46 open are cut away, as is indicated at 57 and 60 in FIGURE 4. In consequence, units 10 can be arranged in four stacks in the manner shown in FIGURE 1 with the flat surfaces 60 of the respective units cooperating to form a well 61 to receive terminal leads 27, 28 and 36. This well is sufficiently large to accommodate the leads of numerous layers of the potentiometer units stacked one above the other. Additionally, the flattened opposite ends 57 of the units are located along the exterior corners of the stacks and present the outer ends 50 of adjusters 47 for ready access to a technician having occasion for adjusting the potentiometer.

It will be apparent from the foregoing that the units 10 may be compactly packed in various other arrangements than that shown, it being understood that in the present commercial version of the disclosed potentiometer as many as 50 or more of the units may be mounted in a single cubic inch of space with each being accessible for individual adjustment.

While the particular subminiature potentiometer herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A subminiature potentiometer comprising a pair of one-piece superimposed casing members of nonconductive material each having an integral central boss in axial alignment and projecting toward one another from the interior surfaces of said casing members, one of said casing members having an annular groove concentric with the base of its central boss and having at least one stepped side wall providing an annular groove wider across its top, a wire-wound resistive element nested in the relatively narrow bottom portion of said annular groove, a rotary ring member supported for rotary movement on said stepped side wall near the relatively wide upper portion of said groove and having a contact finger engaged with said resistive element, and rotary drive means operatively connected to said ring member and held captive between the mating edges of said casing members and adjustable from the exterior of said casing to rotate said contact finger relative to said resistive element.

2. A potentiometer as defined in claim 1 characterized in that said rotary ring member is provided on its upper surface with an annular drive ring means having driving engagement with the inner end of said rotary drive means.

3. A potentiometer as defined in claim 2 characterized in that said rotary drive means includes a one-piece drive shaft journaled about an axis extending radially of said rotary ring member and of said annular groove in which said resistive element is nested, and aligned journal supports for said drive shaft positioned laterally to either radial edge of said annular drive ring member.

4. A potentiometer as defined in claim 1 characterized in that the one of said bosses overlying said annular groove has a rim edge which projects radially beyond the inner rim edge of said rotary ring member in closely-spaced relation thereto for holding said rotary ring member rotatably assembled within the relative wide upper portion of said annular groove.

5. A potentiometer as defined in claim 2 characterized in that said annular drive ring means secured to said rotary ring member has teeth mating with complemental teeth on the inner end of said rotary drive means.

6. A subminiature potentiometer comprising a cup-shaped lower casing having an upstanding boss centrally of its interior and cooperating with the surrounding side wall to form an annular groove, said groove side walls being stepped to provide a narrow channel at the bottom of said groove and a relatively wide channel across the upper portion of said groove, a wire-wound resistive element nested in said narrow channel, a shallow metal contactor ring having an upturned edge loosely supported in said relatively wide channel and including a contact finger depending into wiping contact with said resistive element, a cover for said lower casing having a portion thereof closely spaced above the upturned edge of said contactor ring and cooperating therewith to hold the same in assembled position in said groove, and manually adjustable means for rotating said contactor ring relative to said resistive element.

7. A potentiometer as defined in claim 6 characterized in that said boss is formed with channel means opening through the upper end thereof and including a portion effective to have a snug friction fit with one end of a lead wire terminal in an area rearward of the end of the latter, and a lead wire terminal seated in said channel means having the end thereof in resilient wiping contact with said rotary contactor ring.

8. A potentiometer as defined in claim 7 characterized in that said casing and cover are formed with separate passages extending from the interior to the exterior thereof and opening into the interface between the mating surfaces of said casing and cover, and terminal leads extending through said separate passages from said ring contactor and from the opposite ends of said resistive element.

9. A potentiometer as defined in claim 6 characterized in that said cover and said lower casing have interfitting posts and receiving wells therefor positioned to assure accurate assembly of said casing and cover in predetermined positions relative to one another.

10. A potentiometer as defined in claim 6 characterized in that said casing and the cover therefor are provided centrally thereof with aligned passages for receiving a mounting fastener.

11. A potentiometer as defined in claim 8 characterized in that the passages for said terminal leads are diametrically opposite the rotary drive means for adjusting said contactor ring.

12. A potentiometer as defined in claim 8 characterized in that said casing and the cover therefor have complementally-shaped interfitting projection and recess means in the interface between the mating surfaces of said casing and cover effective to assure the accurate positioning of the latter members in the final assembly operation of said potentiometer.

13. A potentiometer having a pair of upper and lower wafer-like casing members, one of said members having an annular groove interiorly thereof, a wire-wound resistive element seated in said groove, a rotary contactor rotatable about the axis of said resistive element and having a contact finger bearing against the winding on said resistive element, said rotary contactor having a ring of gear teeth on one axial end face thereof, the juxtaposed edges of said casing members being recessed radially to provide journal means therebetween, manually adjusted means for rotating said rotary contactor from the exterior edge of said wafer-like casing, said last-mentioned means being mounted in and held captive by said journal means with its axis extending diametrically through the axis of rotation of said rotary contactor in a plane parallel to and closely spaced from the gear teeth face thereof, said manually adjustable means having a pinion gear of frusto-conical shape fixed thereto and in mesh with the gear teeth on said rotary contactor.

14. A potentiometer as defined in claim 13 characterized in that the axis of said pinion gear is so spaced relative to the teeth on said rotary contactor that the pinion gear teeth are in light pressure contact with the base areas of the teeth of said rotary contactor thereby to avoid backlash and lost motion.

15. In a subminiature potentiometer of the type having a casing formed of a pair of complementally shaped casing halves held together against relative rotation with their juxtaposed rim edges in direct contact, an adjustable resistor housed within said casing having terminals connected to its opposite ends and means movable relative to each of said casing halves supporting a contactor adjustable along said resistor and provided with adjusting means accessible from the exterior of said casing and having a terminal, all three of said terminals being accessible for electrical connections from the exterior of said casing; that improvement which comprises aligned openings passing through centers of said pair of casing halves between the remote faces thereof and out of communication with interior portions of the potentiometer, said aligned openings being spaced to one side of said adjusting means for adjusting the position of said contactor and being adapted to receive a mounting fastener for selectively clamping either outer face of said potentiometer immovably in frictional contact with a cooperating support surface, thereby to present said terminals in a desired oriented position suitable for attaching the same to other electrical components and with the adjusting means for said resistor conveniently positioned for access when adjusting said contactor.

16. A potentiometer as defined in claim 15 characterized in the provision of thin-walled tubular sleeve means having a snug fit within said central openings and including means at its opposite ends located inwardly of the outer surfaces of said casing members for holding said casing members assembled to one another.

17. A potentiometer as defined in claim 16 characterized in that the opposite ends of the central openings through said casing halves are provided with a shallow countersink, and the ends of said tubular sleeve means being overturned and clenched into said shallow countersinks whereby said sleeve ends do not project beyond the opposed faces of said casing halves to increase the thickness thereof.

18. A subminiature potentiometer adapted to be mounted in stacked closely compacted arrangement with numbers of other similar potentiometers using mounting members common to more than one potentiometer and effective to clamp a plurality of potentiometers adjustably in desired relatively oriented positions wherein the adjusters of the individual potentiometers are most conveniently accessible; said potentiometer having a wafer-like casing formed of nonmovable components having their peripheral rims in contact and cooperating in enclosing therewithin a split ring type resistor element, a rotary contactor movable in an arc along the length of said element, drive means for said contactor having an operating end accessible from one edge of said wafer-like casing, and a single mounting opening passing centrally through said casing having a length not in excess of the distance between the remote faces of said wafer-like casing, said opening being out of communication with the components enclosed within the interior of said casing and being spaced to one side of said drive means for said contactor and adapted to receive a mounting fastener by which the remote faces of said wafer-like casing can be frictionally clamped in a desired mounting position after having been rotated to a desired position about the axis of said central opening, and means projecting laterally from one peripheral edge portion of said casing for providing electrical connections from components exteriorly of said casing to said contactor and to said resistor element.

19. The invention defined in claim 18 characterized in that a plurality of similar potentiometers as defined are superimposed one on another with their respective central openings in alignment, and a single fastener passing through said alignment openings and holding the juxtaposed surfaces of said potentiometers frictionally clamped together with each potentiometer in a predetermined oriented position about the axis of said aligned openings.

20. A subminiature potentiometer having upper and lower wafer-like casing halves, the lower one of said casing halves having an upstanding boss in the center portion thereof surrounded by a concentric groove which is wider at its upper portion, an annular resistive element seated in the bottom of said groove, the wider upper portion of said groove having an annular shoulder on at least one side wall thereof, a rotary ring concentric with and journalled about said boss and seated upon siad shoulder, metallic contactor means secured to and underlying said ring and having resilient wiping contact with the said resistive element as said ring is rotated about said boss, electrically conductive means including a wiping contact between a terminal wire of said potentiometer and said contactor means and effective to maintain a conductive path with said resistive means as said ring is rotated in either direction, the upper one of said casing halves mating against the upper surface of said lower casing half and cooperating therewith to hold the components enclosed by said halves in assembled relation therein, and rotary adjusting means held journalled between said upper and lower halves and in driving engagement with the upper side of said ring and effective to rotate the latter in either direction depending on the direction of rotation of said adjusting means.

21. A potentiometer as defined in claim 20 characterized in the provision of a tubular sleeve extending vertically through said boss and the overlying portion of said upper casing half and having its opposite ends peened over against the remote surfaces of said casing halves and cooperating therewith to hold the components of said potentiometer assembled, and the peened-over axial length of asid sleeve being not in excess of the distance between the remote exterior surfaces of said upper and lower casing halves.

22. A potentiometer comprising a housing of insulating material formed in two parts contoured on their mating faces to interengage to hold said parts immovably in registry with one another, said housing parts having a continuous central passage opening therethrough with its opposite ends terminating substantially flush with the remotely positioned flat exterior faces of said housing parts, said housing parts having an interior cavity generally concentric with and out of communication with said central passage, resistive means immovably supported in said cavity, rotary means in said cavity having a contactor in contact with said resistive means and movable therealong, electrical conductor means extending from said contactor and from the opposite ends of said resistive means to the exterior of said housing, and adjustable means journaled between said housing parts entirely to one side of said central passage with its outer end exposed and its inner end in rotary driving contact with said rotary means and operable to drive the latter to move said contactor along said resistive means, a plurality of said potentiometers being stackable with their adjacent flat exterior surfaces in direct contact with one another and their central passages in alignment to receive a common mounting fastener for clamping said potentiometers in stacked relation.

23. A potentiometer as defined in claim 22 characterized in that the adjacent mating faces of said housing parts are sealed together by a bonding agent and being further characterized in that said adjustable means is journaled between the mating faces of said housing parts and includes a plurality of independent rib-like means projecting radially from the inner end portion thereof and engageable with said rotary means to rotate the same positively and in a direction dependent on the direction of rotation of said adjustable means.

24. A potentiometer adapted to be stacked one against another for support by a common support member passing therethrough, said potentiometer having a housing of nonconductive material formed in two parts with flat parallel exterior faces and adjacent inner faces bonded immovably together and shaped to form a single central mounting passage opening through said exterior faces and an interior cavity surrounding but out of communication with said central mounting passage, stationary resistive means supported in said cavity, rotary means in said cavity having a contactor movable along and in continuous contact with said resistive means, electrical terminal means extending through said housing from said contactor and from the opposite ends of said resistive means, and adjuster means journaled between said housing parts having its axis generally parallel to the plane of said exterior faces and having its inner end in driving contact with said rotary means and its outer end accessible for adjustment to vary the position of said contactor along said resistive means.

25. A potentiometer comprising a wafer-like housing of general egg-shape as viewed from one face thereof and having its opposite ends cut off to lie parallel to one another, generally circular resistor means housed within said housing including a rotary contactor movable therealong, a single central opening extending between the faces of said wafer-like housing and sealed from the components enclosed thereby, said central opening being adapted to receive fastener means for clamping said potentiometer immovably against a supporting surface, rotary adjusting means in driving relation to said rotary contactor and accessible at one of said cut-off ends, and terminal wires extending through the other of said cut-off ends.

26. A wafer-like miniature potentiometer having generally flat opposed faces and generally flat parallel lateral edge surfaces across the opposite edges thereof, a stationary annular resistor in contact with a rotary contactor concealed within said potentiometer, manually adjustable means having a driving connection with said rotary contactor and accessible at one of said flat lateral edge surfaces, terminal lead means extending from said contactor and from said annular resistor through the other of said flat lateral edge surfaces, and a passage for a single clamping fastener extending through the center of said potentiometer between the opposed flat faces thereof which passage is sealed from the components housed within said potentiometer.

27. A potentiometer as defined in claim 26 characterized in the provision of a plurality thereof arranged in a ring with the terminal wires thereof immediately adjacent one another and with the manually adjustable means thereof arranged about the outer juxtaposed edges of said ring.

References Cited by the Examiner

UNITED STATES PATENTS

| | | | |
|---|---|---|---|
| 2,273,760 | 2/1942 | Nelson | 338—150 |
| 2,877,328 | 3/1959 | Bourns | 338—163 |
| 2,880,293 | 3/1959 | Blanco | 338—164 |
| 2,952,825 | 9/1960 | Bourns | 338—163 X |
| 2,999,992 | 9/1961 | Morrish | 338—163 |
| 3,099,810 | 7/1963 | Habereder | 338—162 |
| 3,105,217 | 9/1963 | Ferrel et al. | 338—164 X |

FOREIGN PATENTS 1,129,616　9/1956　France.

ANTHONY BARTIS, *Acting Primary Examiner.*

RICHARD M. WOOD, *Examiner.*